(No Model.) 14 Sheets—Sheet 3.

F. PURDON & H. E. WALTERS.
APPARATUS FOR OBTAINING MOTIVE POWER FROM RUNNING WATER.

No. 506,725. Patented Oct. 17, 1893.

Fig. 3.

Witnesses:
Chas J. Gooch
Frank G. Grimes

Inventors
F. Purdon and H. E. Walters
by Herbert W. T. Jenner
Atty.

(No Model.) 14 Sheets—Sheet 5.

F. PURDON & H. E. WALTERS.
APPARATUS FOR OBTAINING MOTIVE POWER FROM RUNNING WATER.

No. 506,725. Patented Oct. 17, 1893.

(No Model.) 14 Sheets—Sheet 6.

F. PURDON & H. E. WALTERS.
APPARATUS FOR OBTAINING MOTIVE POWER FROM RUNNING WATER.
No. 506,725. Patented Oct. 17, 1893.

(No Model.) 14 Sheets—Sheet 11.

F. PURDON & H. E. WALTERS.
APPARATUS FOR OBTAINING MOTIVE POWER FROM RUNNING WATER.

No. 506,725. Patented Oct. 17, 1893.

Witnesses:
Chas. J. Gooch
Frank G. Grimes

Inventors:
F. Purdon and H. E. Walters.
by Herbert W. T. Jenner
Atty.

(No Model.) 14 Sheets—Sheet 13.

F. PURDON & H. E. WALTERS.
APPARATUS FOR OBTAINING MOTIVE POWER FROM RUNNING WATER.

No. 506,725. Patented Oct. 17, 1893.

(No Model.) 14 Sheets—Sheet 14.

F. PURDON & H. E. WALTERS.
APPARATUS FOR OBTAINING MOTIVE POWER FROM RUNNING WATER.

No. 506,725. Patented Oct. 17, 1893.

UNITED STATES PATENT OFFICE.

FREDERICK PURDON AND HARRY ERNEST WALTERS, OF LONDON, ENGLAND.

APPARATUS FOR OBTAINING MOTIVE POWER FROM RUNNING WATER.

SPECIFICATION forming part of Letters Patent No. 506,725, dated October 17, 1893.

Application filed March 28, 1893. Serial No. 468,088. (No model.) Patented in England March 29, 1892, No. 6,070.

*To all whom it may concern:*

Be it known that we, FREDERICK PURDON and HARRY ERNEST WALTERS, subjects of the Queen of Great Britain and Ireland, residing at 2 Great George Street, Westminster, London, in the county of Middlesex, England, have invented certain new and useful Improvements in Apparatus for Obtaining Motive Power from Running Water, (for which we have obtained a patent in England, No. 6,070, dated March 29, 1892;) and we do hereby declare the following to be a full, clear, and exact description of the invention, such as will enable others skilled in the art to which it appertains to make and use the same.

This invention relates to water motors; and it consists in the novel construction and combination of the parts hereinafter fully described and claimed.

It has been found that in a running stream a converging mouthpiece (to be hereinafter called "intake") will discharge a larger quantity of water than would be discharged through a parallel intake having dimensions of the same sectional area as the smaller end of the converging intake. The apparatus employed to effect this result is arranged so that the impact of the current on the blades and the discharge may be as perfect as possible. For this purpose we have placed in the intake guide vanes of a curved form so contrived as to cause the water to strike the blades at the most effective angle and we have formed the intake itself with four converging walls in order to increase the quantity and velocity of the water passed through.

In order to make our invention more clearly understood we will describe it with reference to the accompanying drawings which represent two alternative designs of our water motor. The two designs differ only in the shape and arrangement of the blades, chain, and water intake.

In the drawings: Figs. 1 and 2 together form an elevation of the motor partly in section. Figs. 3 and 4 are plans of the motor, Fig. 4 being partly in section. Fig. 5 is an end elevation, and Fig. 6 a transverse vertical section with the blades and wheels removed. Figs. 7 and 8 are two views of one of the blades and Figs. 9 and 10 represent the means by which the blades are attached to the chain.

Figure 3:
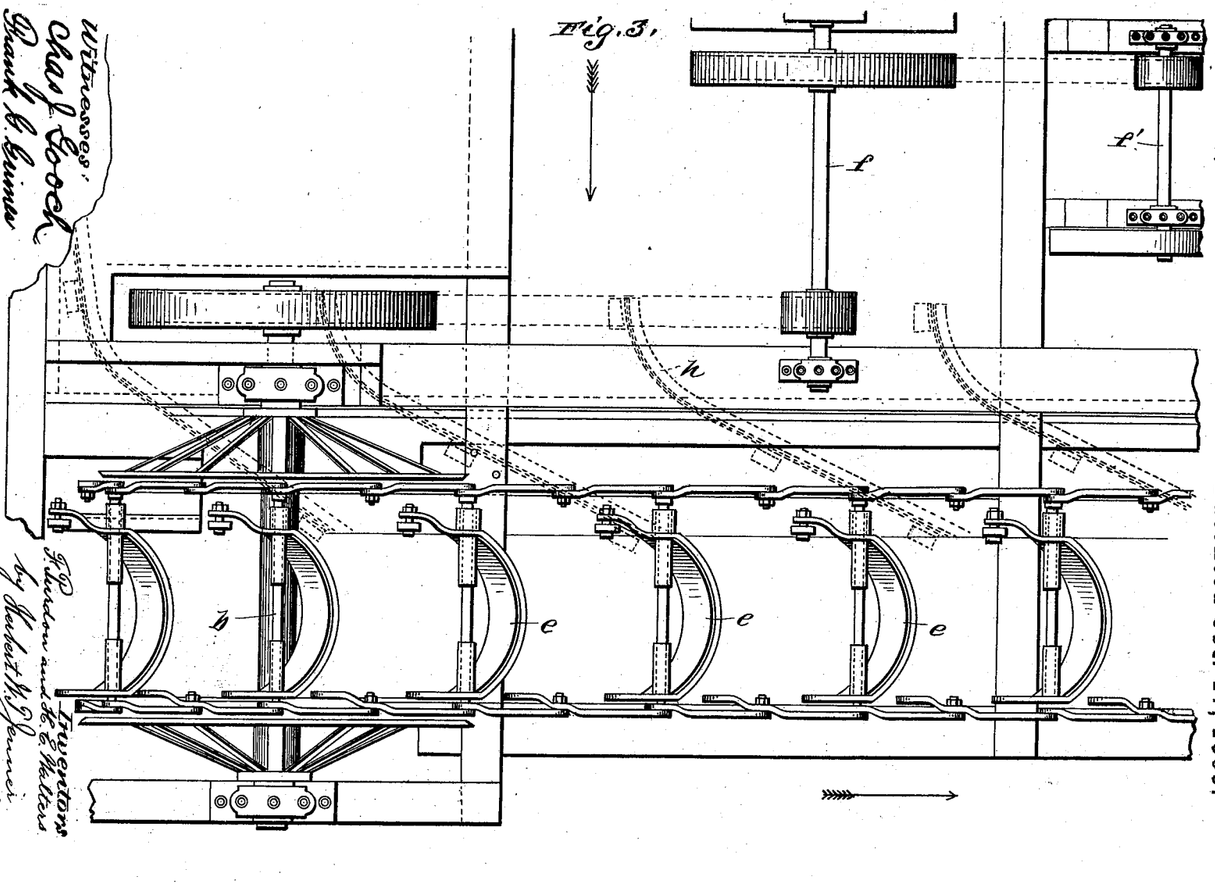
Figure 13:
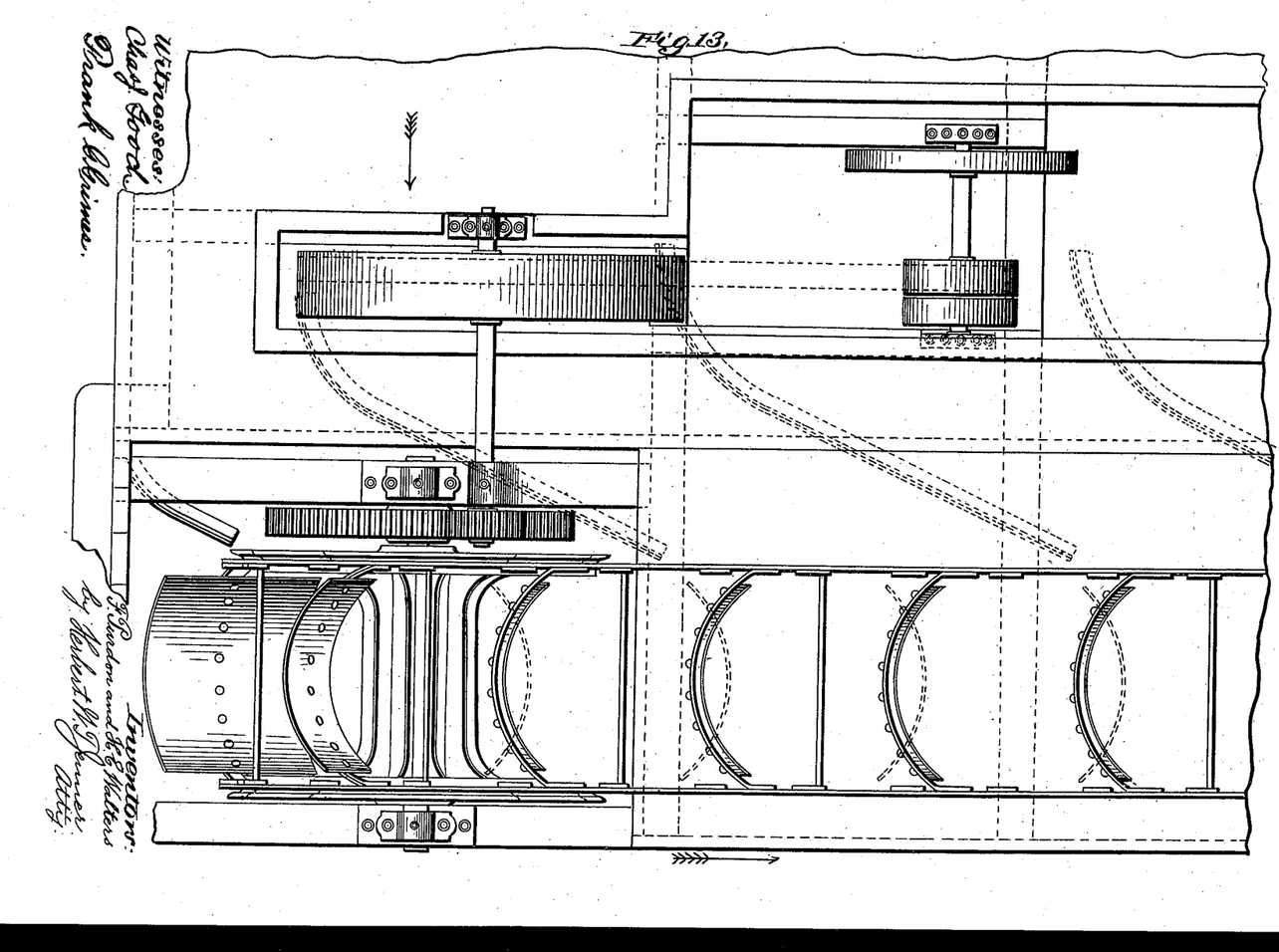
Figs. 13 and 14 together represent a plan of this motor.

The direction of the current and direction of movement of the blades are shown by arrows in Figs. 3 and 13.

Similar letters refer to similar parts throughout the different views.

Figure 1:
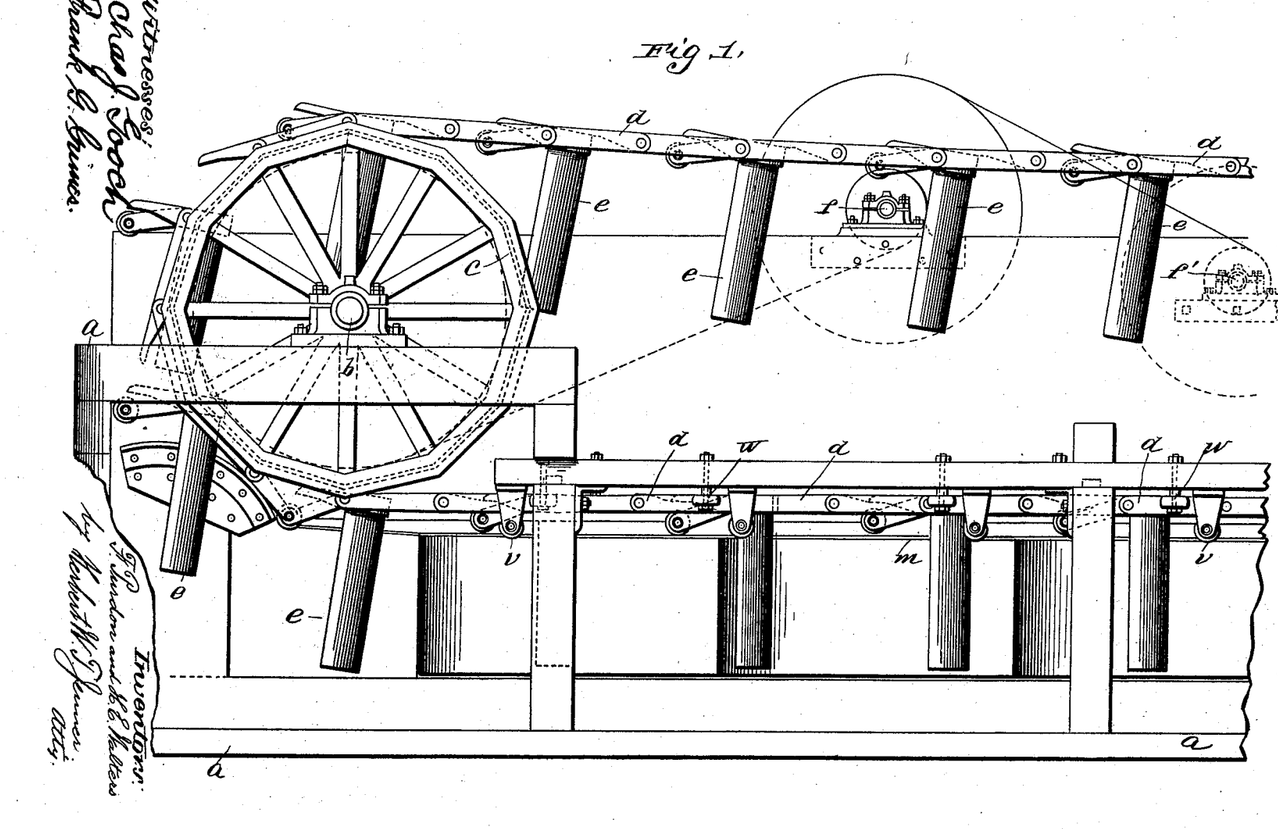
—Figures 1 to 10 represent one arrangement of our motor and the remaining figures represent the arrangement of the alternative design.

In Fig. 1, *a, a* is the framework of the ponton. Upon the ponton are mounted the shafts *b, b'* which respectively carry the large wheels *c, c'*. The shaft *b'* works in plumber blocks which are adjustable horizontally by means of a screw, as represented. The endless chain *d* composed of a series of links is held in position and carried by the hereinbefore mentioned wheels *c* and *c'*; it supports a number of blades *e*, the construction of which is more clearly shown in Figs. 7, 8, 9, and 10. The chain *d* is supported at its lower part by means of rollers so placed as to cause it to run in a straight line from one wheel to the other. The blades are so constructed as to take the pressure of water in one direction while feathering during the action of leaving the water.

Figure 4:
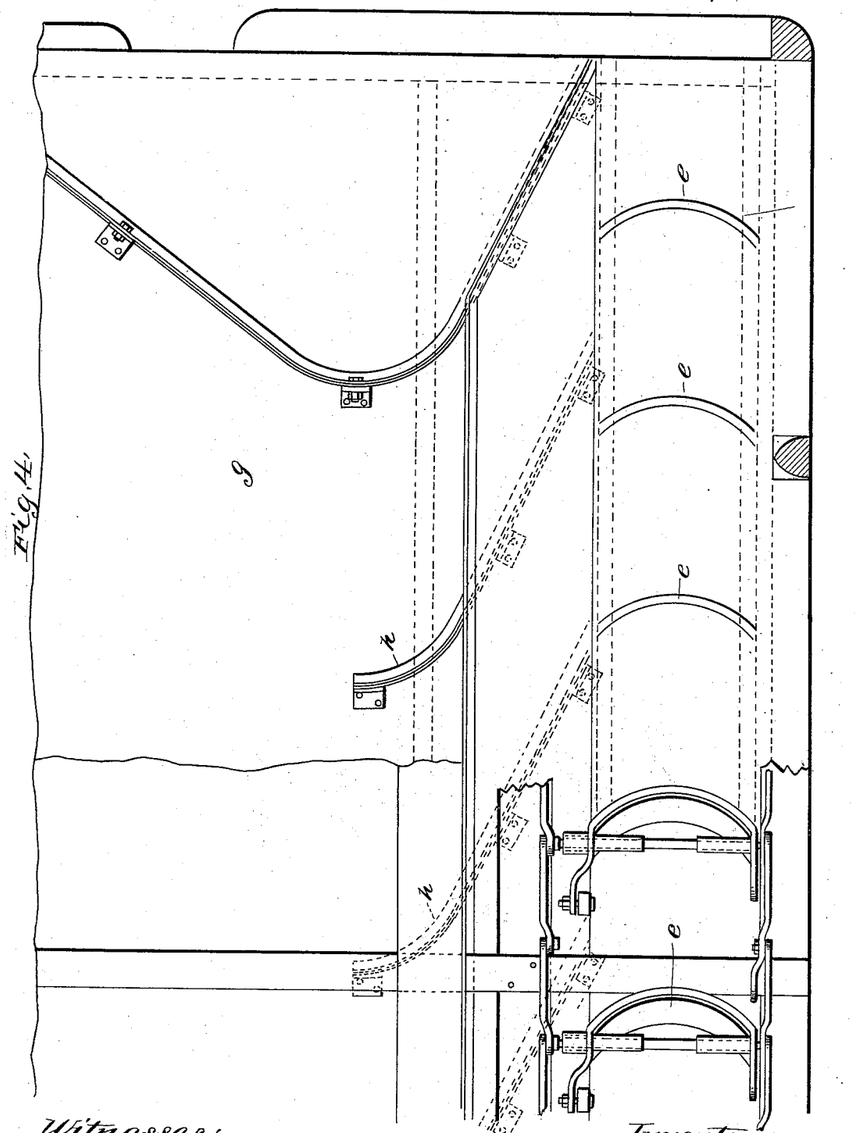
Figure 5:
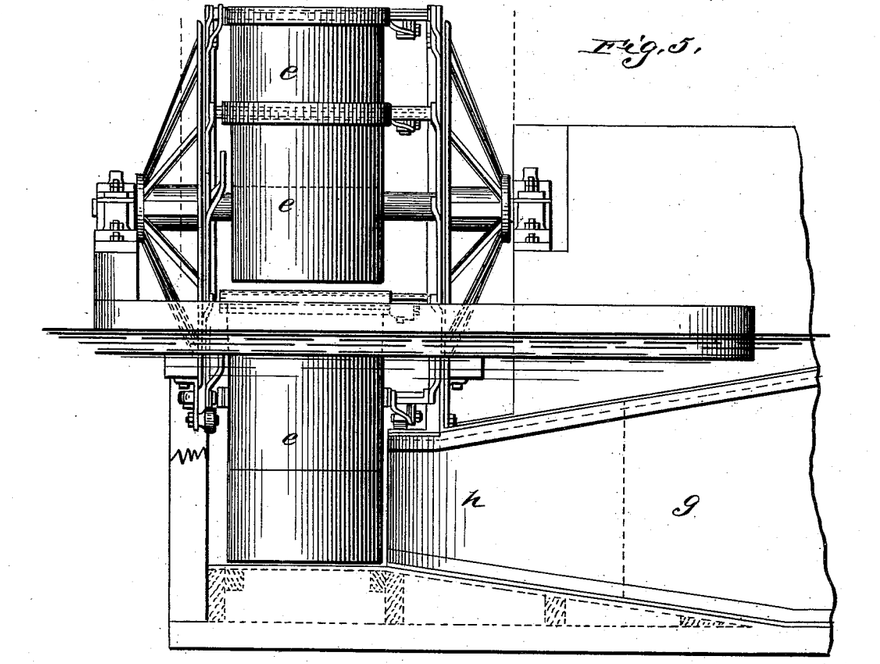

Fig. 3 shows the method by which the power may be transmitted from the first motion shaft *b* to the countershafts *f, f'*. The direction of motion of the blades is at right angles to the direction of flow of the stream. The water enters the intake *g* shown most clearly in Figs. 4, 5 and 6. The sectional area of this intake diminishes as it approaches the line of blades. Guiding vanes of a curved form *h* are fixed in the intake *g* and serve the purpose of directing the water at a suitable angle upon the face of the blades *e*. The sectional area of the chamber formed between one guide vane and the next guide vane diminishes as it approaches the blades.

Figure 6:
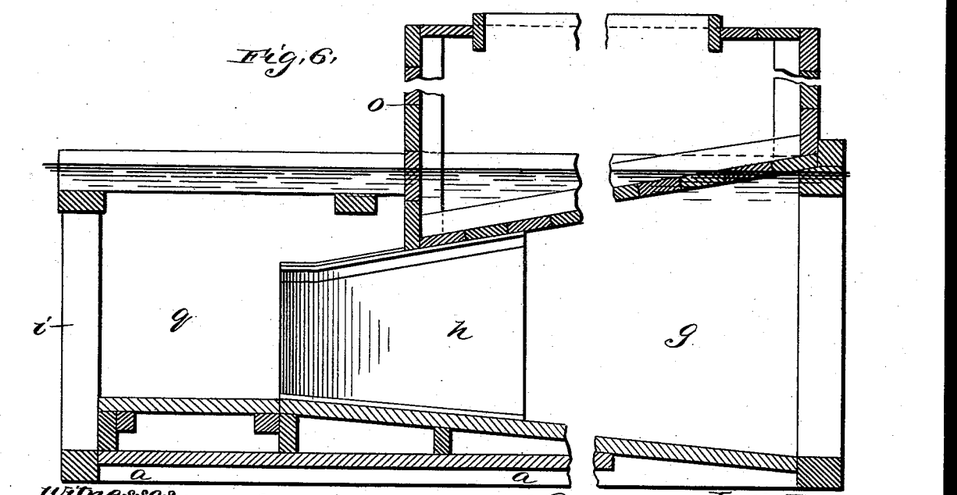

Fig. 6 which is a transverse section of the ponton clearly shows the form of the intake $g$; the water after acting upon the blades leaves the motor at the point $i$.

We will now refer in detail to the mechanism of the blades.

Figure 7:
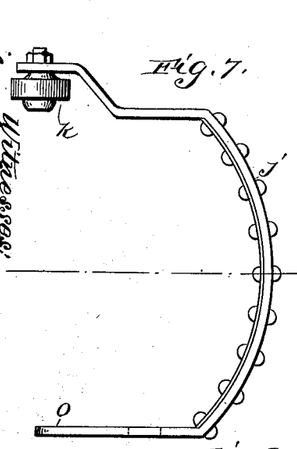
Figure 8:
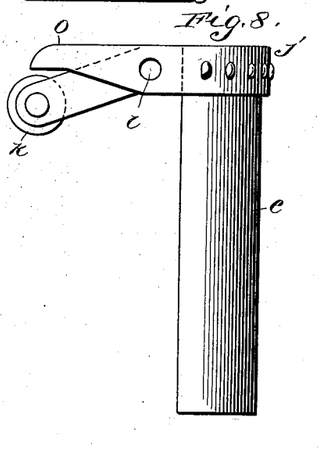
Figure 9:
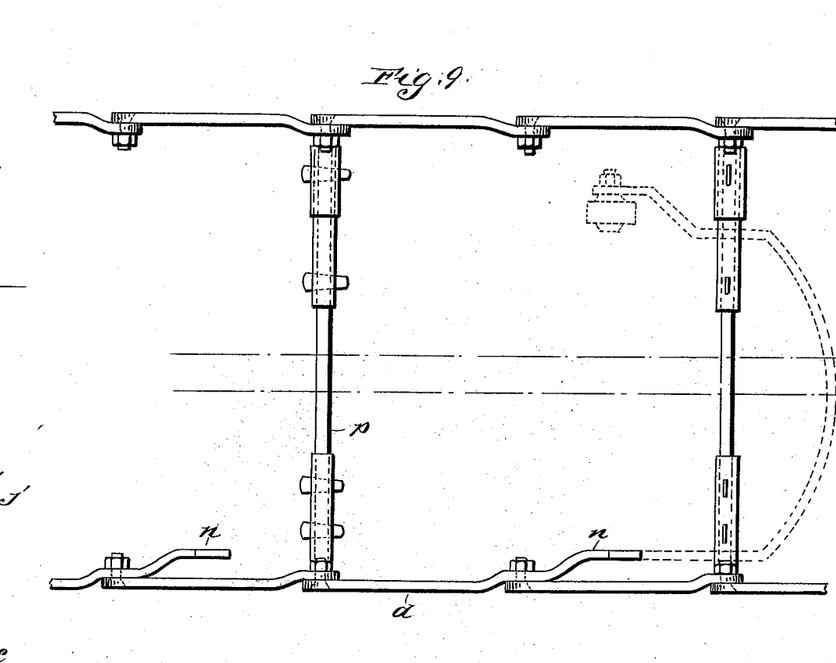
Figure 10:
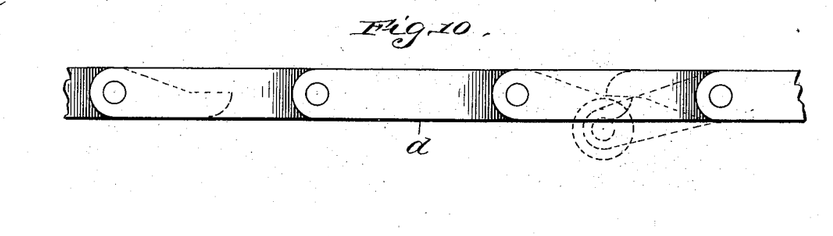

Fig. 7 represents a plan, and Fig. 8 an elevation of one of the blades. The blade $e$ is preferably constructed of a bent steel plate; to the top of the plate is attached a bar $j$ carrying a roller $k$; a pin passes through the hole $l$ and through a similar hole in the links of the chain $d$. It is obvious therefore that the blade $e$ is free to rotate about the point $l$ as the pin is left slack in the hole $l$. The blades $e$ thus retain at all times an approximately vertical position and the rollers $k$ compel the blades and links to take their right position by coming into contact with the path $m$. Figs. 9 and 10 represent the arrangement of endless chain. It consists of separate links of a suitable form to engage with the cross bars of the blades $e$. The part $n$ of the chain $d$ supports the part $o$ of the blade bar Fig. 8. The correct distance between the two sides of the chain $d$ is kept constant by means of the cross bars $p$ and suitable cotters.

We will now proceed to describe our alternative method of forming the blades.

Figure 2:
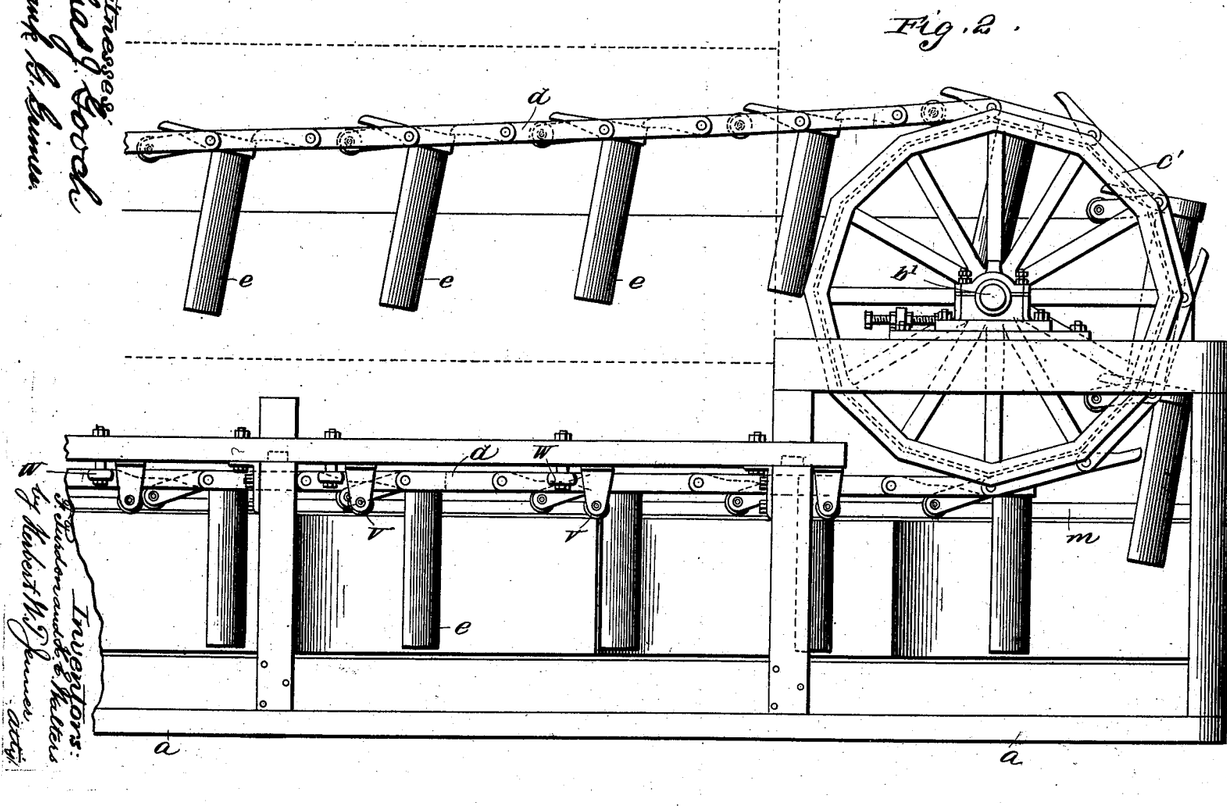
Figure 11:
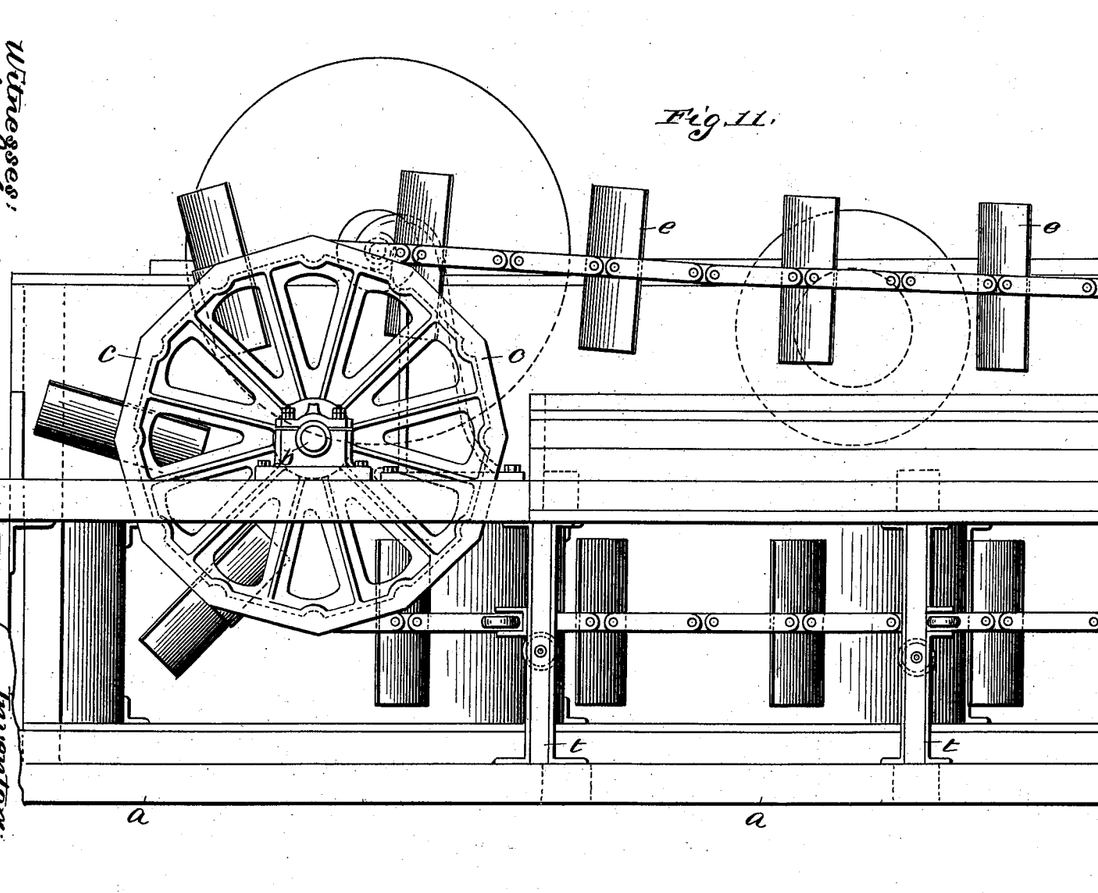
Figs. 11 and 12 together represent an elevation of our second arrangement of motor.
Figure 12:
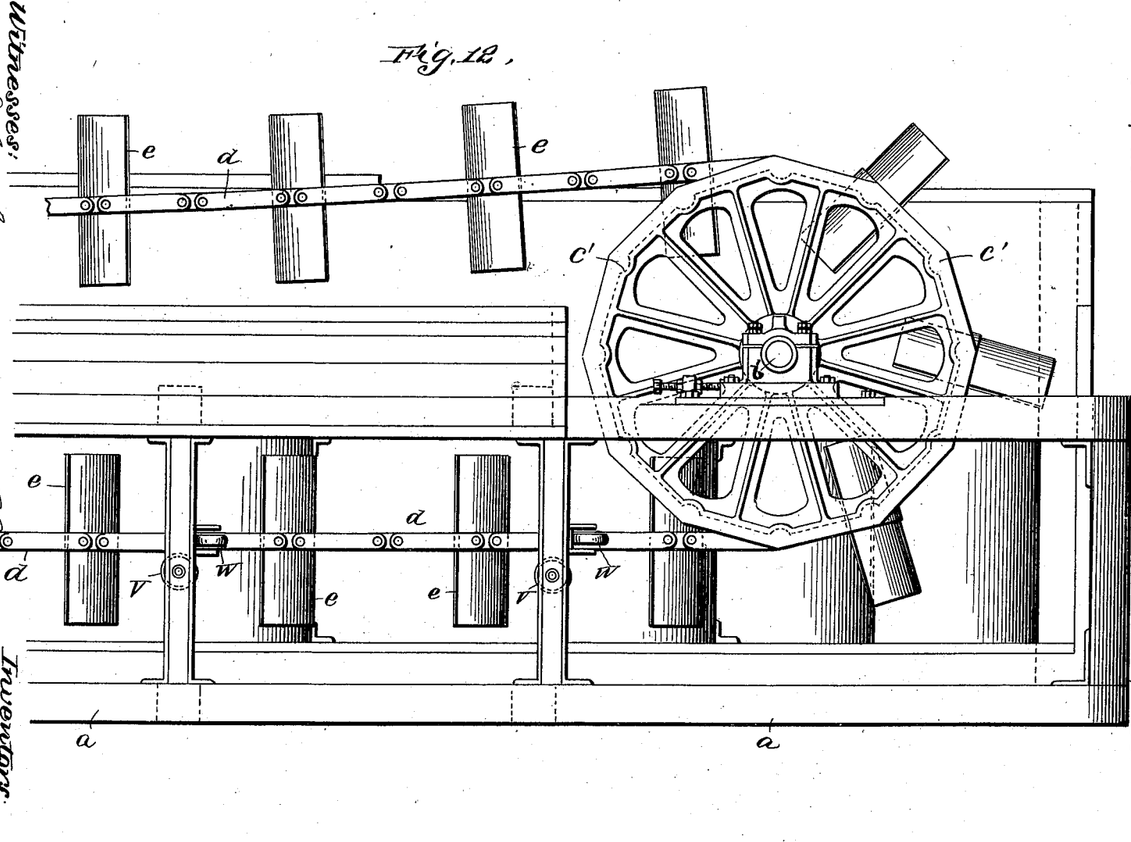
Figure 14:
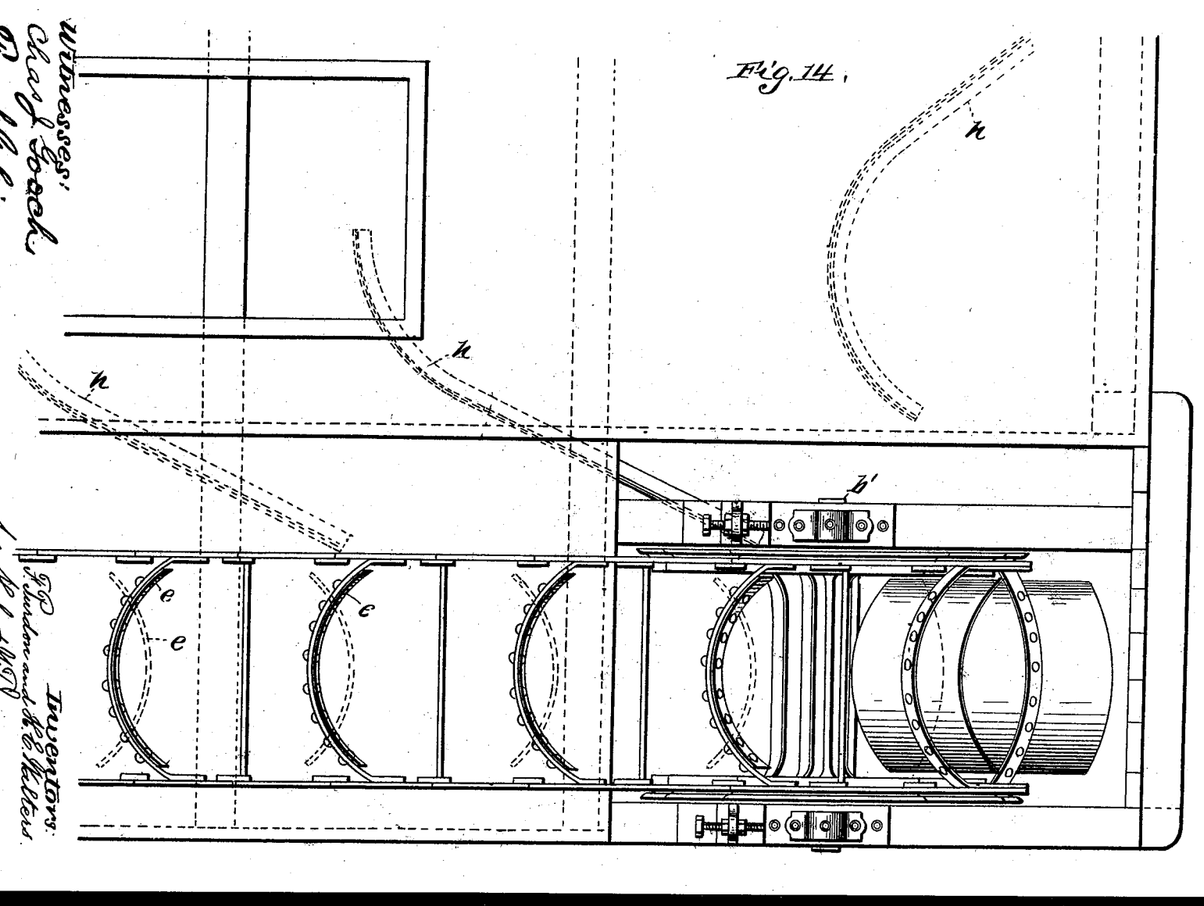
Figure 15:
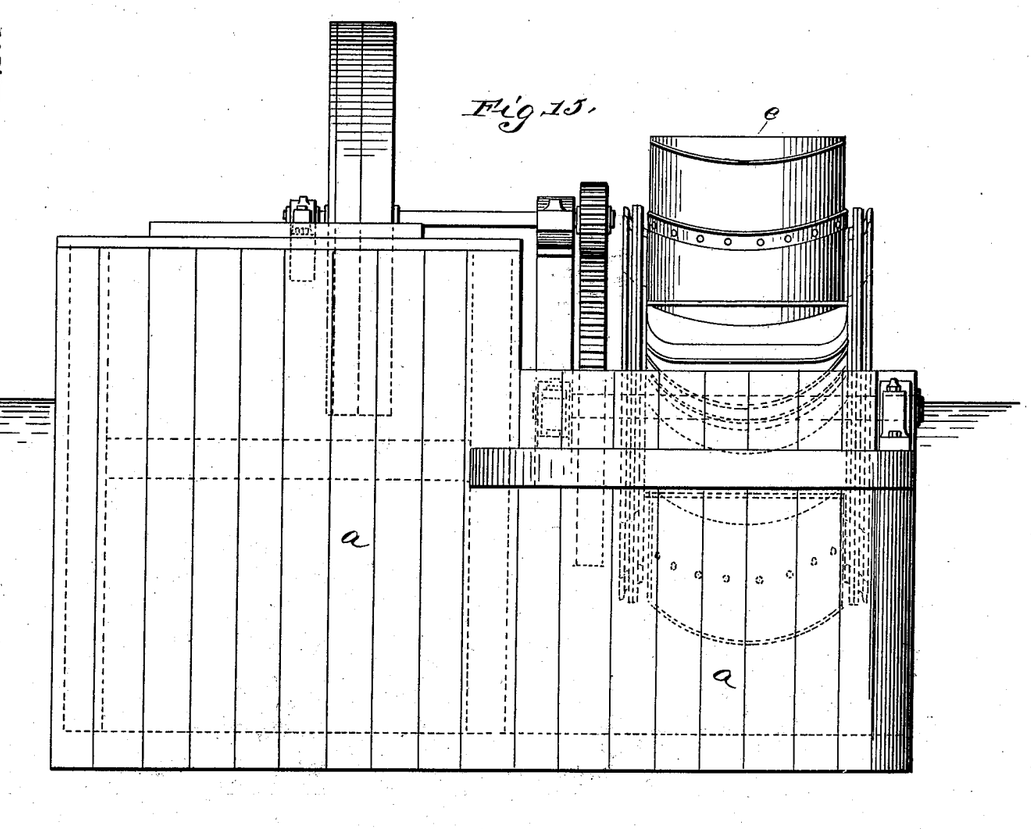
Fig. 15 is an end elevation.
Figure 16:
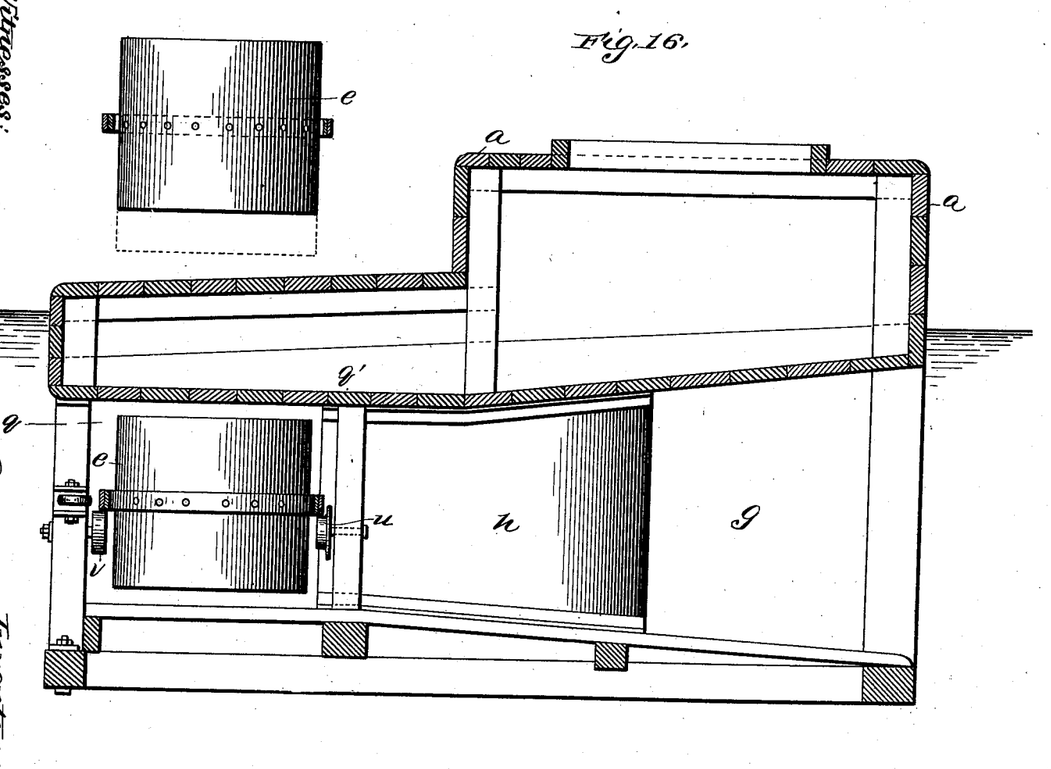
Fig. 16 a transverse section.
Figure 17:
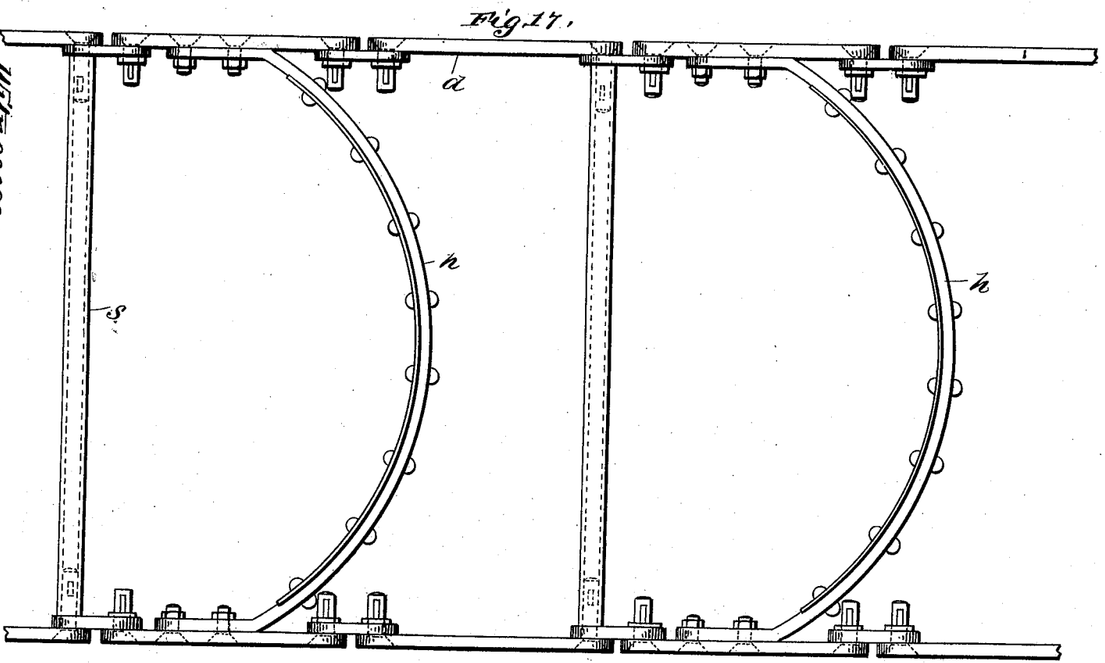
Figs. 17 and 18 represent the method of fixing the blades to the endless chain.
Figure 18:
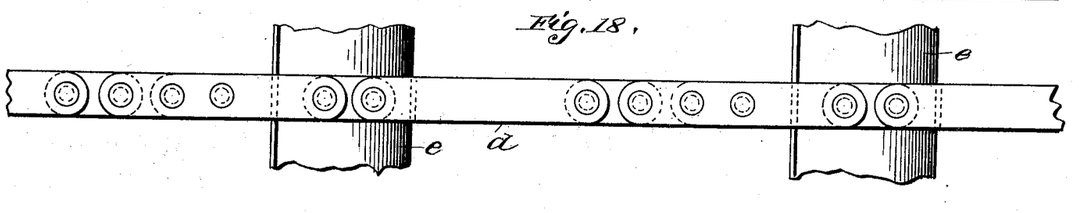
Figures 19, 20:
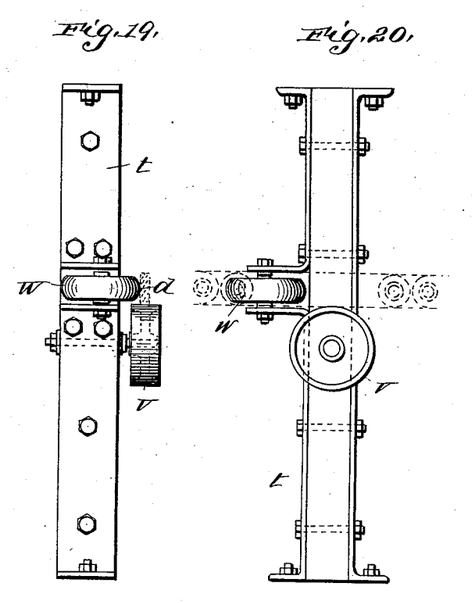
Figs. 19, 20, 21 and 22 represent the method of forming and supporting the rollers which guide the endless chain.
Figure 21:
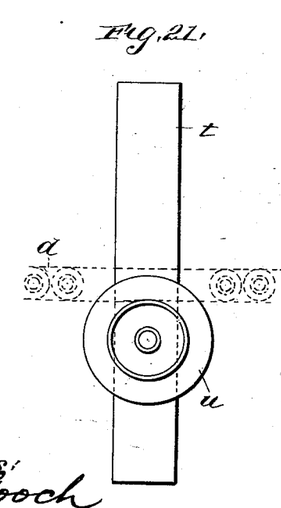
Figure 22:
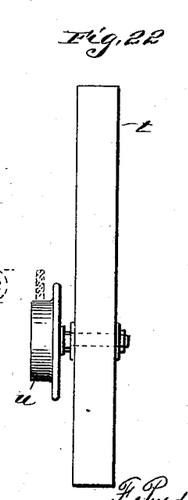

Figs. 11 and 12 together represent an elevation of our second type of motor. As before, the ponton is lettered $a$; the shafts and wheels are similar to those represented in Figs. 1 and 2 with variation in detail to suit the different form of blades. Figs. 13 and 14 together form a plan of the complete machine. The course of the water is shown by an arrow and the course of the dotted blades is shown by a second arrow. It will be understood that the blades $e$ represented by full lines are those returning through the air, while those shown dotted are being acted upon by the water. The end elevation, Fig. 15, represents the blades descending into the water. The difference in the form of ponton between that represented in Figs. 11 to 16 inclusive, and that shown in Figs. 1 to 6 inclusive, is that while in Fig. 6 the intake $g$ delivers the water into a water way $q$ which has parallel sides and an open top, in Figs. 11 to 16 inclusive a wooden floor or covering $q'$ Fig. 16, is placed above the line of blades upon which the water is acting. Thus the blades $e$ move through the water in a water way $q$ which has parallel sides and which is inclosed at the top and bottom. Figs. 13 and 14 show an arrangement of guide vanes $h$ quite similar to that described in Figs. 3 and 4. The variation in form of blades is shown in Figs. 17 and 18. In place of supporting the blades by means of a cross bar at the top, the blade bar $h$ is now placed across the middle of the steel plate forming the blade; this blade bar is shown riveted to the blade and attached at its end to two links in the endless chain $d$. The two sides of the chain are kept at a suitable distance apart by means of tubes $s$ through which cotters are driven. The chain $d$ is therefore flexible but the blades do not maintain a vertical position when out of the water as they do in the first motor described. The difference is clearly indicated in Figs. 1 and 11. The lower part of the chain is guided by means of rollers attached to supports $t$. These are shown more clearly in Figs. 19 to 22 inclusive. The supports $t$ carry flanged wheels $u$ which prevent the chain from sagging and also prevent lateral displacement. We also use another arrangement shown in Figs. 19 and 20 in which a wheel $v$ carries the weight of the chain while a separate wheel $w$ prevents lateral displacement of the chain. The actual arrangement of the rollers and wheels is best shown in Fig. 16. The ponton may be constructed without guide vanes, $h$, and may then be moored at such an angle that the direction of the current upon the blades is the same as when the guide vanes are used.

The ironwork comprising the stays, chain, wheels, &c., of Figs. 1 to 11 can be fitted to the ponton shown and described with reference to Figs. 11 to 22.

Having fully described our invention, what we claim, and desire to secure by Letters Patent, is—

1. In a current motor, the combination, with a frame provided with parallel sides forming a water-way $q$, of the revoluble end-wheels, the chains passing around said end-wheels, and the buckets attached to the chains and moving along the said water-way at an angle to the direction of the main current; and an intake provided with converging sides and secured to the side of the said frame, whereby a portion of the main current is increased in velocity and caused to impinge on the said buckets in the direction of their travel, substantially as set forth.

2. In a current motor, the combination, with a frame provided with parallel sides forming a water-way $q$, of the revoluble end-wheels, the chains passing around the said end-wheels, and the buckets attached to the chains and moving along the said water-way at an angle to the direction of the main current; and an intake provided with converging sides and vertically-arranged, curved and converging guide-vanes, whereby a portion of the main current is increased in velocity and caused to impinge on the said buckets in the direction of their travel, substantially as set forth.

In testimony whereof we affix our signatures in the presence of two witnesses.

FREDERICK PURDON.
HARRY ERNEST WALTERS.

Witnesses:
WILLIAM B. CANDY,
JOHN P. O'DONNELL.